US007664982B2

(12) United States Patent
Mue et al.

(10) Patent No.: US 7,664,982 B2
(45) Date of Patent: Feb. 16, 2010

(54) METHOD AND SYSTEM FOR STORING RECOVERY RELATED INFORMATION ON A COMPUTER MEMORY

(75) Inventors: Lawton Chun-Hing Mue, Cupertino, CA (US); Inderjit Singh Chohan, Cupertino, CA (US); Khanh Tran, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 467 days.

(21) Appl. No.: 11/588,441

(22) Filed: Oct. 26, 2006

(65) Prior Publication Data

US 2008/0155302 A1 Jun. 26, 2008

(51) Int. Cl.
*G06F 11/00* (2006.01)
(52) U.S. Cl. .................. 714/5; 714/6; 714/15; 711/162
(58) Field of Classification Search ...................... 714/2, 714/5, 6, 15, 19; 711/162; 717/174
See application file for complete search history.

(56) References Cited

U.S. PATENT DOCUMENTS

| | | | |
|---|---|---|---|
| 6,948,166 B2 * | 9/2005 | Barfield et al. .............. 717/174 |
| 7,143,067 B1 * | 11/2006 | Cheston et al. ............... 705/59 |
| 7,185,335 B2 * | 2/2007 | Hind et al. ................... 717/176 |
| 7,337,359 B2 * | 2/2008 | Lee ............................. 714/19 |
| 7,398,524 B2 * | 7/2008 | Shapiro ....................... 717/175 |
| 2005/0240815 A1 * | 10/2005 | Purkeypile et al. ............ 714/15 |

OTHER PUBLICATIONS

"Using Gateway System Recovery" retrieved from "http://support.gateway.com/s/Manuals/Desktops/9532287.pdf" available as early as Nov. 3, 2005.*

* cited by examiner

*Primary Examiner*—Philip Guyton

(57) ABSTRACT

Methods and systems for storing recovery related information on a computer memory are described. One exemplary method comprises accessing a user input relating to a user selection of applications to be restored upon executing a recovery of the memory and storing on a recovery partition of the memory a recovery image corresponding to a user image on a user partition of the memory. The user image comprises the user selection of applications. Upon executing a recovery, the recovery image is copied to the user partition such that the user image is configured to correspond to the recovery image. The recovery image is derived from a set of applications that includes at least one un-installed application.

34 Claims, 8 Drawing Sheets

METHOD AND SYSTEM FOR STORING RECOVERY RELATED INFORMATION ON A COMPUTER MEMORY

BACKGROUND

The personal computer (PC) and similar modern computer systems use memory related devices, such as a hard disk and other drives (hereinafter "drives") for storing and accessing data and program code. During their function, computer programs sometimes encounter operational problems, which can cause the program(s) to stop properly operating. Some such problems (e.g., "crashes") cause the computer itself to require restarting, resetting and/or other recovery functions that typically affect one or more of its drives.

Recovery applications are stored on a recovery partition of a drive, which is typically hidden. Alternatively, recovery applications can run from recovery media, typically available from a support source, pre-provided or made from another source. Either way, the recovery application enables two recovery pathways. Normal recovery is non-destructive of user data. Full recovery, by contrast, is destructive to user data, because it typically re-formats the user partition, sometimes known as the 'c' drive, of a PC.

Some conventional recovery solutions function by unzipping files related to the operating system (OS), applications, drivers and tools that are stored on the recovery partition. These unzipped file contents are then copied to the user partition. Corresponding files on the user partition are overwritten with this unzipped content. Thus, a recovery image is effectively copied from the recovery partition to form a user image thereof on the user partition.

Typically, the recovery image restores the user image to correspond with the original software configuration of the PC. Thus, the OS is restored on the user partition, along with all of the applications, drivers and tools. Upon running a conventional recovery, the user partition is effectively restored to the same configuration with which it was supplied new to a first user. Users however may not keep the original configuration with which their PC was supplied.

Users may, for instance, un-install applications they do not regularly use. The users thus free up drive space. Finite drive space can be valuable—even at a premium for some users' computer. Other programs such as so-called trial-ware, which are typically low value to many if not most users but provided bundled with more useful applications by PC distributors for promotional reasons, may also be un-installed by users early in their use of a PC. Trial-ware removal, besides freeing up valuable drive space, may relieve the user of more irritating aspects of some trial-ware, such as pestering obnoxious pop-up prompts to purchase extended use for the unwanted but bundled software.

Yet when a user runs conventional recovery on a PC, all of the original programs, including previously user un-installed applications and trial-ware, are restored to the user partition. This re-occupies drive space that the user has previously freed up. Further, if users desire, after running a recovery, to reconfigure the user partition to the configuration they prefer, they must repeat the un-install action for each and every application they do not want stored thereon. This can be inefficient, time- and labor-consuming, expensive and/or vexing.

Moreover, conventional recovery solutions effectively store application and other code in duplicate, with bits written to the user partition effectively mirrored on the recovery partition. In a sense, conventional recovery solutions can thus seem inherently inefficient in relation to drive space economy. Such inefficiency is effectively multiplied where the recovery partition stores bits for unwanted and user-removed applications.

BRIEF DESCRIPTION OF THE DRAWINGS

Prior Art

DETAILED DESCRIPTION

Figure 1:
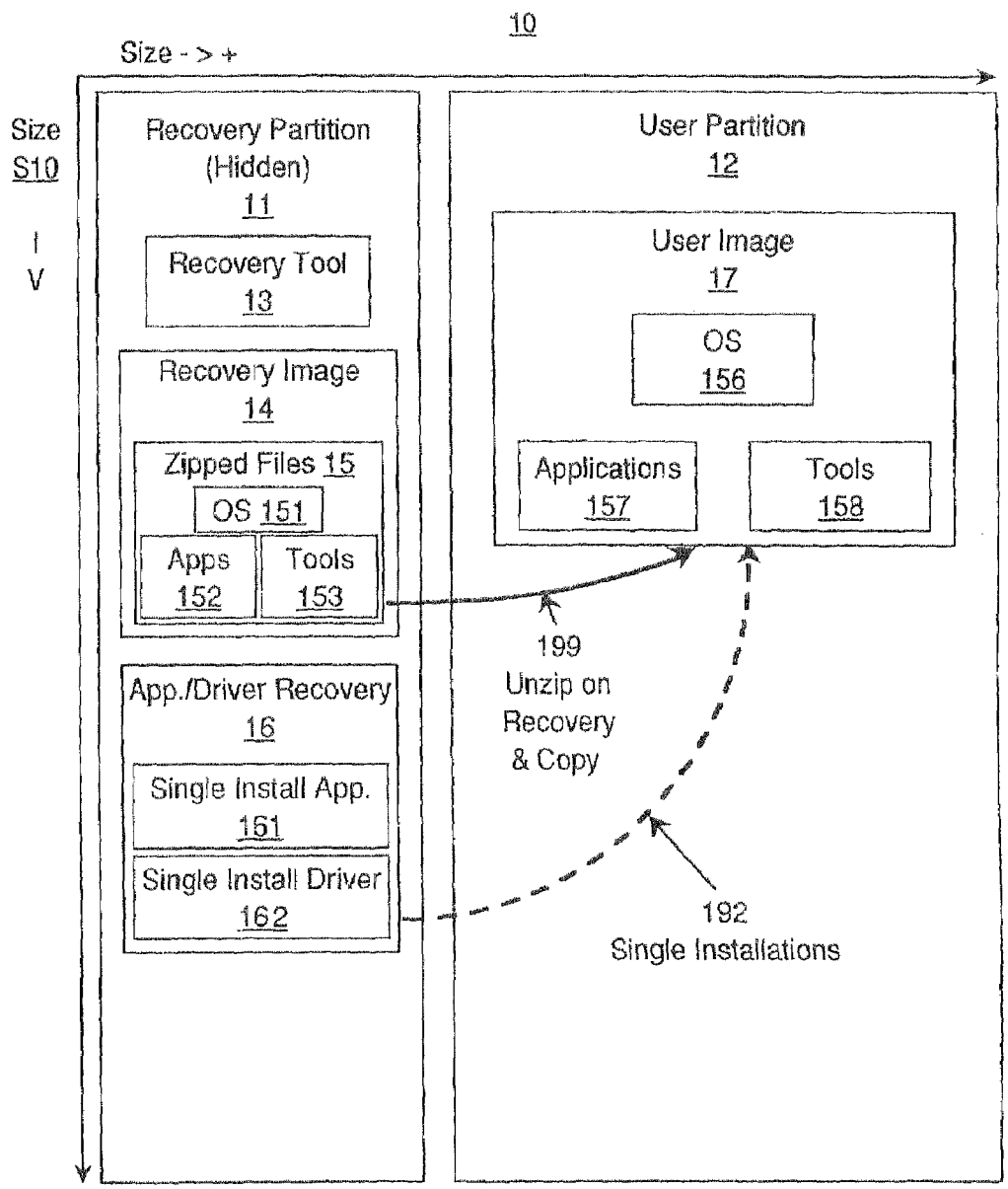
FIG. 1 depicts a conventional recovery solution.

Exemplary embodiments of methods and systems for storing recovery related information on a computer memory and for dynamically updating recovery related information are described below. Reference will now be made in detail to embodiments of the present invention, examples of which are illustrated in the accompanying drawings. While the present invention will be described in conjunction with the following embodiments, it is to be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details.

Portions of the detailed description that follows are presented and discussed in terms of processes. Although functions and sequencing thereof are disclosed in figures herein (e.g., FIGS. 3 and 5) describing the operations of these processes (e.g., processes 30 and 500, respectively), such functions and sequencing are exemplary. Embodiments are well-suited to performing various other functions or variations of the functions recited in the flowcharts of the figures herein, and in a sequence other than that depicted and described herein.

The exemplary embodiments described below relate to methods and systems for storing recovery related information on a computer memory-related device, such as a hard disk drive (e.g., a hard drive) or another drive. The exemplary embodiments described herein efficiently store recovery related information and dynamically update recovery related information.

Some embodiments comprise accessing a user input relating to a user selection of applications to be restored upon executing a recovery of the drive and storing on a recovery partition of the drive a recovery image. The recovery image corresponds to a user image, which comprises the user selection of applications, on a user partition of the drive. Upon executing a recovery, the recovery image is copied to the user partition such that the user image is configured to correspond to the recovery image. Some embodiments comprise monitoring the computer for an application that is un-installed by the user. Such user un-installed applications are flagged. The recovery image is dynamically updated on the basis of the flagging, such that code relating to the user un-installed applications is selectively removed from the recovery image.

Embodiments enable customizable recovery with dynamic, on-the-fly installation resulting in a single instance of an original application and driver on the recovery partition. This effectively reduces the size and storage requirements associated with the recovery partition, thus increasing available drive space to a user.

Therefore, finite and potentially valuable drive space is economically conserved in recoveries executed based on recovery images of embodiments. Drive space reclaimed by users upon un-installing unwanted applications also advantageously remains free thereof upon running a recovery according to embodiments described herein. Further therefore, embodiments beneficially obviate time, labor, trouble, inconvenience, annoyance and/or expense a user could incur to un-install the various unwanted applications anew, after running conventional recovery. Moreover, efficiency is achieved, in contrast to conventional recovery solutions. In embodiments described herein, duplicative storage of recovery related application information, e.g., on both the recovery partition and the user partition, is effectively obviated.

Prior art FIG. 1 depicts a conventional recovery solution on a computer drive 10. Drive 10 has a user partition 12, corresponding, for instance, to the familiar 'c' drive of typical PCs. Drive 10 also has a recovery partition 11, which is effectively hidden, e.g., not normally accessible by users of the computer during typical operation thereof. The conventional recovery solution depicted is facilitated with a recovery tool 13. This conventional recovery solution effectively functions by unzipping the zipped files 15, which are stored in the recovery image 14.

Code stored in the zipped files 15 and other aspects of recovery partition 11 consumes (e.g., occupies, resides in, etc.) a certain amount of storage resources, thus effectively giving recovery partition 11 a corresponding certain size S10. The zipped files 15 comprise files 151 related to the operating system (OS), files 152 relating to applications and files 153 related to tools. Files 16 relating to application and driver recovery can also be zipped with files 15 or stored separately there from, as depicted. Files 16 comprise files 161, relating to single installation and other applications and files 162, relating to single installation and other drivers.

The conventional recovery solution shown executes an operation 199 wherein the zipped files 15 are unzipped and the unzipped file contents thereof copied to the user image 17, stored on the user partition 12. The files on the user partition are over-written with this unzipped content. Thus, in this conventional recovery solution, the recovery image 14 is copied from the recovery partition 11 to effectively form a "new" (e.g., over-written) user image 17 thereof on the user partition 12. The recovery solution (or the user) can perform operation 192, wherein single installations of the application and driver files 16 are stored in or restored to the user image 17.

It should be understood that, while the recovery solution described with reference to the drive 10 depicted in prior art FIG. 1, this recovery solution is described to exemplify conventional recovery solutions in general. Other techniques and modalities are practiced in other conventional recovery solutions. Their distinctions with the depicted conventional recovery solution are not substantially germane or related to the present general, exemplary description.

In the conventional recovery solution shown in FIG. 1, the user image 17 is restored by recovery tool 13 to correspond with the recovery image 14. Thus, in the conventional recovery solution depicted, zipped files 15 are effectively unzipped and copied in operation 199 to restore, by over-writing, the user image 17. For instance, the zipped OS files 151 are unzipped and copied to user image 17, thus over-writing its OS files 156 therewith. The zipped application files 152 are likewise unzipped and copied to user image 17, thus over-writing its application files 157 therewith. Similarly, the zipped tools files 153 are unzipped and copied to user image 17, thus over-writing its tools files 158 therewith.

Thus, the OS files 156 are restored in the user image 17, along with applications files 157 and drivers and tools files 158. The conventional recovery solution functions to restore the original software configuration to drive 10. Upon running the conventional recovery solution therefore, the user partition 12 is effectively restored to the same configuration with which it was supplied new to a first user.

Users however may not have kept the original drive 10 configuration with which their PC was supplied. For instance, applications of low value, usefulness, etc. to the users (e.g., user "low value" applications) may have been un-installed, such as to free up storage space on user partition 12. For instance, the user has effectively determined that the space freed up on user partition 12 is of greater value than the applications that they have expended time and effort to un-install.

However, upon executing operation 199 of the conventional recovery solution, the valuable space on user partition 12 that the user has freed up by un-installing originally stored user "low value" applications, is re-occupied upon over-writing the user image 17. To again re-claim the higher user value space on user partition 12, a user must again expend time and effort to effectively repeat un-installing the user "low value" applications.

Moreover, in the conventional recovery solution described with reference to drive 10, application related code and other code is effectively stored in duplicate, with bits stored in application files 157 on the user image 17 effectively mirrored in the recovery image 15, e.g., in the zipped application files 152. In some circumstance, such as those wherein storage space is at a high premium, such duplicative bit storage can thus pose costs associated with inefficiency in storage. Thus for instance, the size S10 of the recovery partition 11 must be large enough to accommodate the storage capacity needed for duplicative storage of recovery related code. Such costs are effectively multiplied where code related to user low value applications are stored in duplicate.

Figure 2:
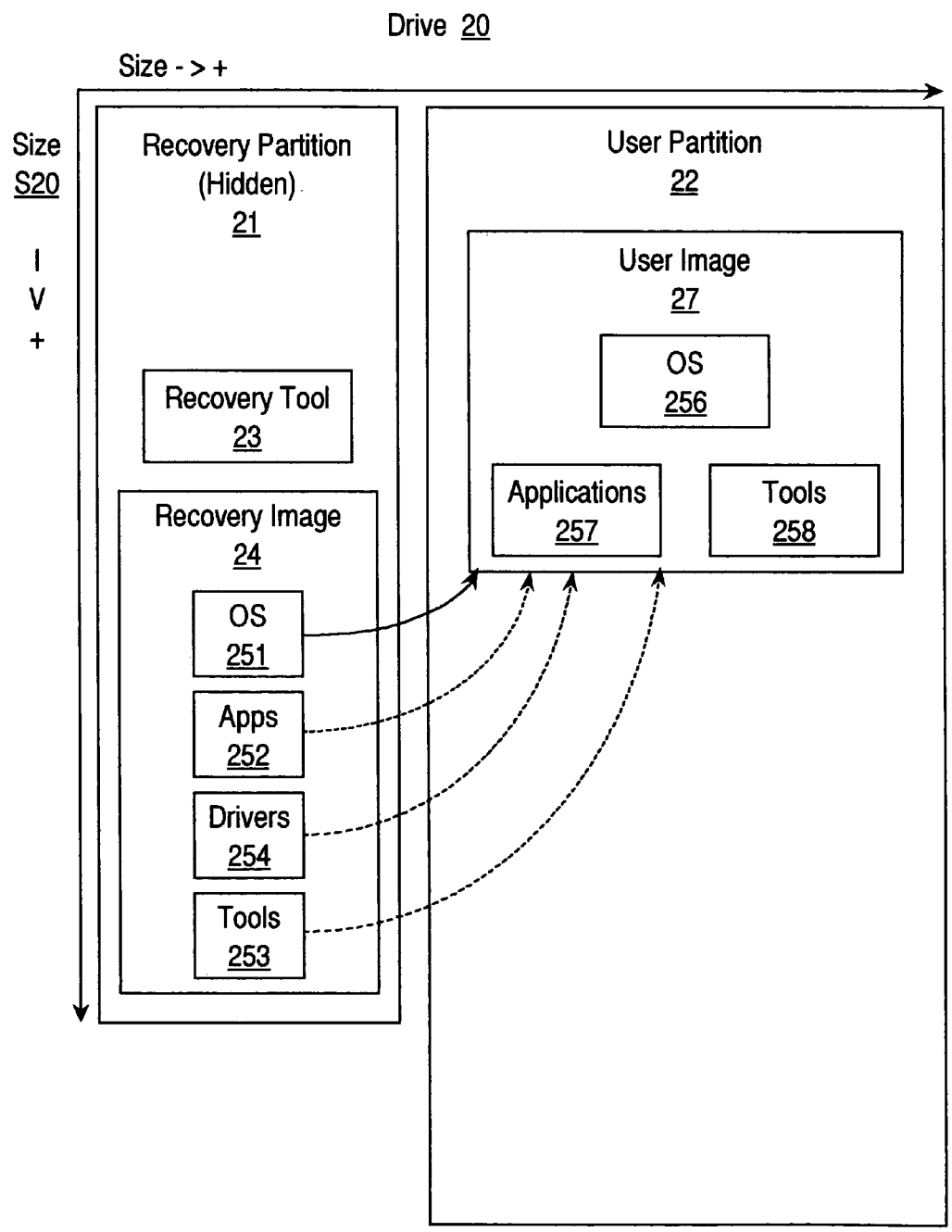
FIG. 2 depicts an exemplary drive, configured for recovery according to an embodiment.

FIG. 2 depicts an exemplary memory related device (e.g., drive) 20, configured for recovery according to an embodiment. Drive 20 has a user partition 22 and a hidden recovery partition 21. Recovery tool 23 facilitates recovery functions, according to an embodiment, such as those described below. Code stored in the recovery image 24 and other aspects of recovery partition 21 consumes a certain amount of storage resources, thus effectively giving recovery partition 21 a corresponding certain size S20.

In some embodiments, downstream processes affected by recovery functions such as those performed with code stored in the user image 27 tie in to the same bits that are available on the recovery image 24. For instance, the OS-related code 256 of the user image 27 ties into (e.g., effectively comprises) the OS-related code 251 of the recovery image. Similarly, the application-related code 257 and the tool-related code 258 of the user image 27 ties into the code 252, 253 and 254 relating to applications, tools and drivers of the recovery image 24.

In contrast with conventional recovery solutions, there is no duplicative storage of this code as stand-alone bits. Thus, the size S20 associated with the recovery partition 21 can be significantly smaller than the corresponding size S10, associated with conventional recovery partition 11 (FIG. 1). For instance, size S20 of drive 20 is smaller than size S10 of conventional recovery partition 11 by at least the storage space freed up by obviating duplicative recovery related code storage. Exemplary recovery related functions performed in accordance with embodiments, are described below.

Figure 3:
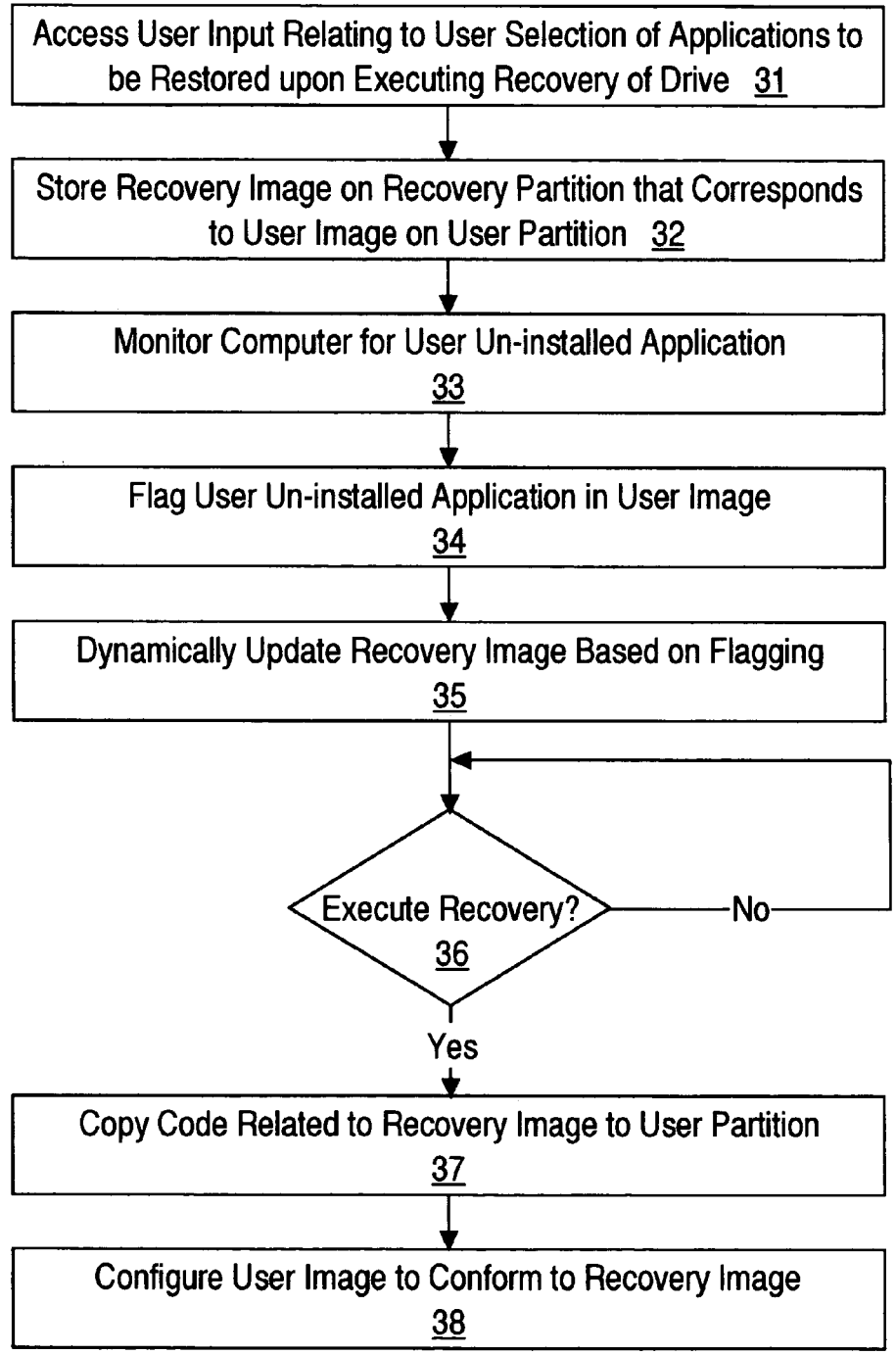
FIG. 3 depicts a flowchart of an exemplary computer implemented method for efficiently storing recovery related information on a drive of the computer, according to an embodiment.

FIG. 3 depicts a flowchart of an exemplary computer implemented method 30 for efficiently storing recovery related information on a drive of the computer, according to an embodiment. Process 30 begins with block 31, wherein a user input relating to the user's selection of applications, which were pre-installed and contained in the recovery partition, to be restored (e.g., to the user partition of a PC drive) upon executing a recovery operation on a drive. Applications, games and the like that are user-installed are not tracked. In block 32, a recovery image is stored on a recovery partition of the drive, which corresponds to a user image on the user partition of the drive and which reflects the user input selecting applications to be restored.

In block 33, the computer (e.g., the drive) is monitored for a user un-installing an application. In block 34, the application. un-installed by the user from the user image is flagged. In block 35, the recovery image is dynamically updated based on the flagging of the application un-installed by the user. For instance, code relating to the application un-installed from the user image by the user is effectively removed (e.g., deleted, etc.) from the recovery image (e.g., from inclusion therein).

In block 36, it is determined whether a recovery operation is to be executed upon the drive. If so, in block 37 code reflecting (e.g., corresponding to, conforming to, identified with, etc.) the recovery image is copied to the user image. In block 38, the user image is configured to conform to the recovery image. Thus, only applications selected for recovery by the user, and no applications that were previously user un-installed from the user partition, are written to the user partition in a recovery operation. In an alternate embodiment, previously un-installed applications can be selected on a per application basis to be included with applications selected for recovery by the user to be written to the user partition. Moreover, applications previously selected can be de-selected for recovery. Process 30 can be complete upon executing block 37.

Figure 4:
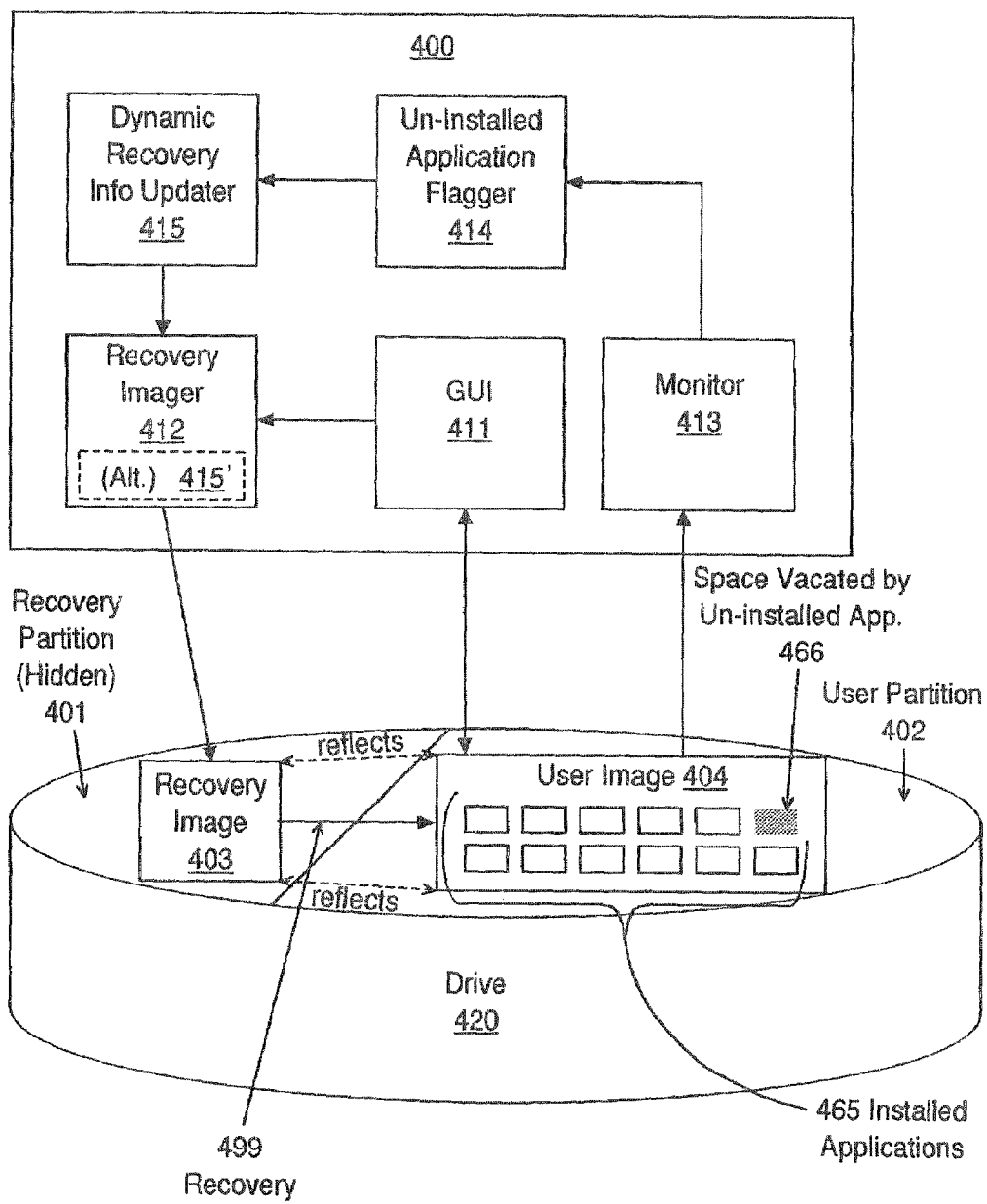
FIG. 4 depicts an exemplary computer based system for efficiently storing recovery related information on a computer drive, according to an embodiment.

FIG. 4 depicts an exemplary computer based system 400 for efficiently storing and dynamically updating recovery related information on a computer drive, according to an embodiment of the present invention. System 400 is associated with recovery functions for a drive 420. Drive 420 has a hidden recovery partition 401 and a user partition 402. In some embodiments, system 400 also functions to dynamically update recovery related information.

It should be appreciated by those of ordinary skill in the relevant arts that the partitioning depicted for drive 420 is representative and solely for descriptive purposes relating to the present embodiment. Thus, drive 420 is depicted herein in a representational way. For instance, those of ordinary skill in the relevant arts will recognize that in practice, data is stored and accessed from drive 420 in a variety of sectors, tracks and the like.

Recovery partition 401 stores a recovery image 403, which is reflective of code related to applications, tools, drivers and OS files comprising the user image 404 on user partition 402. For instance, applications 465 that are installed on user partition 402 are included in the user image 404. However, the user image 404 also has a space 466, which was effectively vacated by an application that was un-installed by a user. Thus, the recovery image 403 reflects the user image 404, for instance to the extent that applications 465 are installed thereon. However, the recovery image 403 does not reflect the application that was un-installed by the user, thus freeing up space 466.

System 400 has a monitor 413, for monitoring the user image 404 of drive 420. Monitor 413 is coupled to an un-installed application flagger 414, which flags applications that are un-installed from the user partition 402 by a user. The un-installed application flagger 414 is coupled to a dynamic information updater 415, which updates recovery related information on the basis of the flagging of user un-installed applications. The dynamic information updater is coupled to a recovery imager 412. In an alternative embodiment, the functionality of dynamic information updater 415' is included, in, performed by and/or subsumed by, etc. the recovery imager 412.

In some embodiments, system 400 comprises a user interface 411. In some embodiments, user interface 411 comprises a graphical user interface (GUI). Changes can be made to user recovery preferences associated with user image 404 with the user interface 411. For instance, in some embodiments, a GUI 411 presents an interactive list of applications, with which a user can select, from among installed applications 465, those applications for which restoration upon recovery is desired and/or those for which restoration upon recovery is not wanted. The user interface 411 is coupled to the recovery imager 412 to allow recovery related user inputs, such as those wherein applications are selected and/or de-selected for restoration to the user image upon recovery, to be used in writing the recovery image 403.

Thus in one embodiment, recovery imager 412 effectively writes the recovery image 403 according to user inputs relating to originally installed software applications selected and/or de-selected for restoration to the user image 404 upon running a recovery, as well as dynamic updates corresponding to the flagging of user un-installed applications, which were part of the originally installed software. Applications, games and the like that are added by the user and then un-installed by the user are not tracked. Upon running a recovery operation 499, the user image 404 is restored according to the user input affected and dynamically updated recovery image 403.

Figure 5:
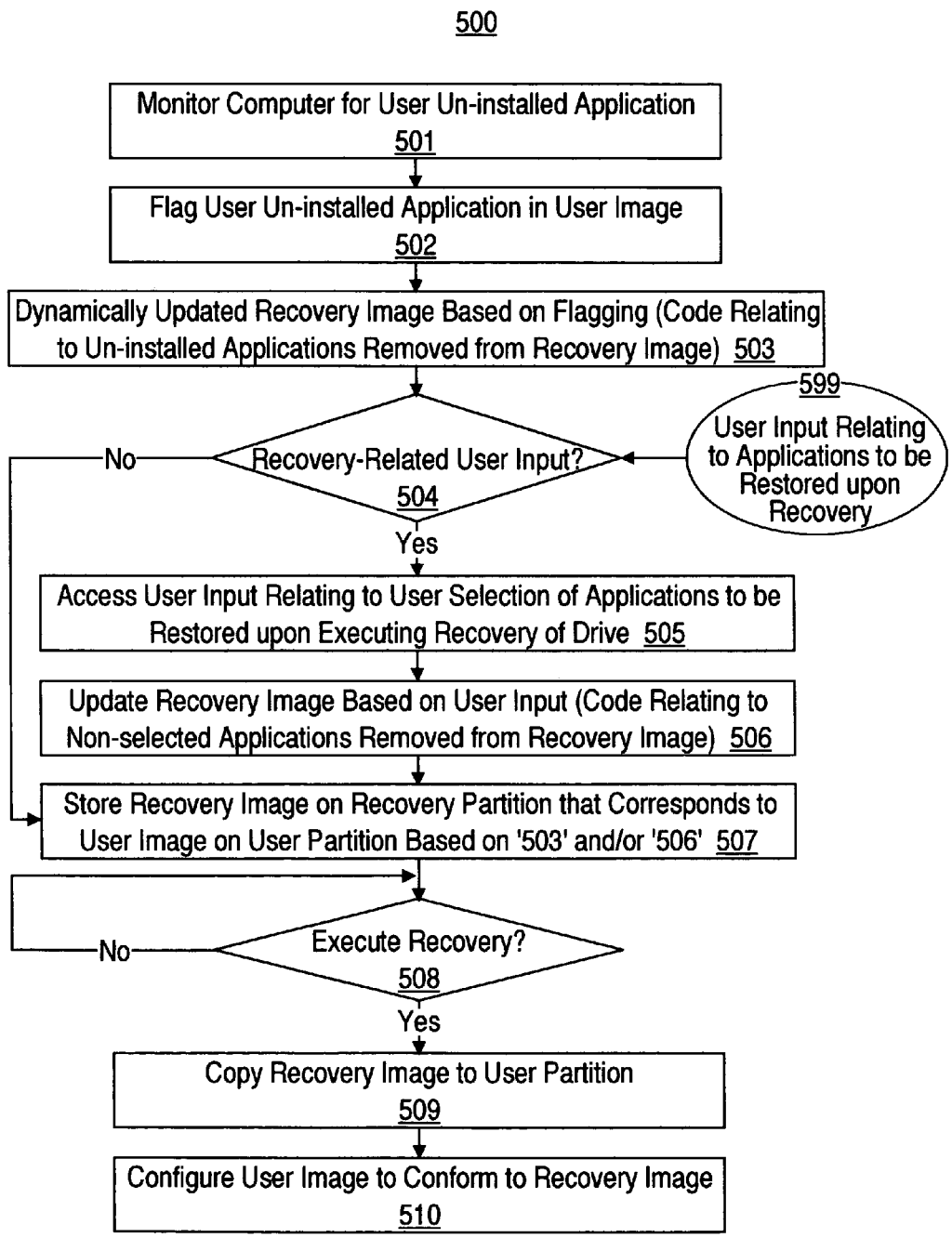
FIG. 5 depicts a flowchart of an exemplary computer implemented method for dynamically updating recovery related information stored on a drive of the computer, according to an embodiment.

FIG. 5 depicts a flowchart of an exemplary computer implemented method 500 for dynamically updating recovery related information stored on a drive of the computer, according to an embodiment. Process 500 begins with block 501 wherein a computer drive is monitored for a user un-installation of an application. In block 502, the user un-installed application is flagged, e.g., in the user image. In block 503, the recovery image for the drive is updated based on flagging the user un-installed application. In some embodiments, code relating to the user un-installed application is removed (e.g., deleted, etc.) from the recovery image.

In block 504, it is determined whether a user input 599, relating to applications to be restored (e.g., and thus selected by the user; e.g., with a GUI) to the user partition of the drive upon running a recovery, was received. If so, in block 505, a user input relating to a user selection of applications selected to be restored (and/or de-selected from being restored) upon running recovery operation is accessed. In block 506, the recovery image is updated, based upon that user input. In some embodiments, code related to a non-selected (and/or de-selected) application is removed from the recovery image. In some embodiments, such code is flagged and thereafter ignored on the basis of that flag.

Upon updating the recovery image in block 506 or, if no recovery related user input was detected in block 504, the recovery image is stored on the recovery partition in block 507 wherein the recovery image reflects (e.g., conforms to, corresponds to, etc.) to the user image on the user partition. For instance, upon executing block 503, the recovery image will reflect the dynamically updated recovery image, based upon flagging applications that are removed from the user image, such as for freeing up storage space on the user partition of the drive. Similarly, upon executing block 506, the recovery image will reflect the user image as a user desires it to be restored upon running a recovery operation, as indicated by application selecting user inputs.

In block 508, it is determined whether a recovery operation is to be executed on the related drive. If so, in block 509, code reflected by the recovery image, which has been dynamically updated and/or subjected to a selective user input, is copied to the user partition. In block 510, the user image is configured to conform to the recovery image.

Figure 6:
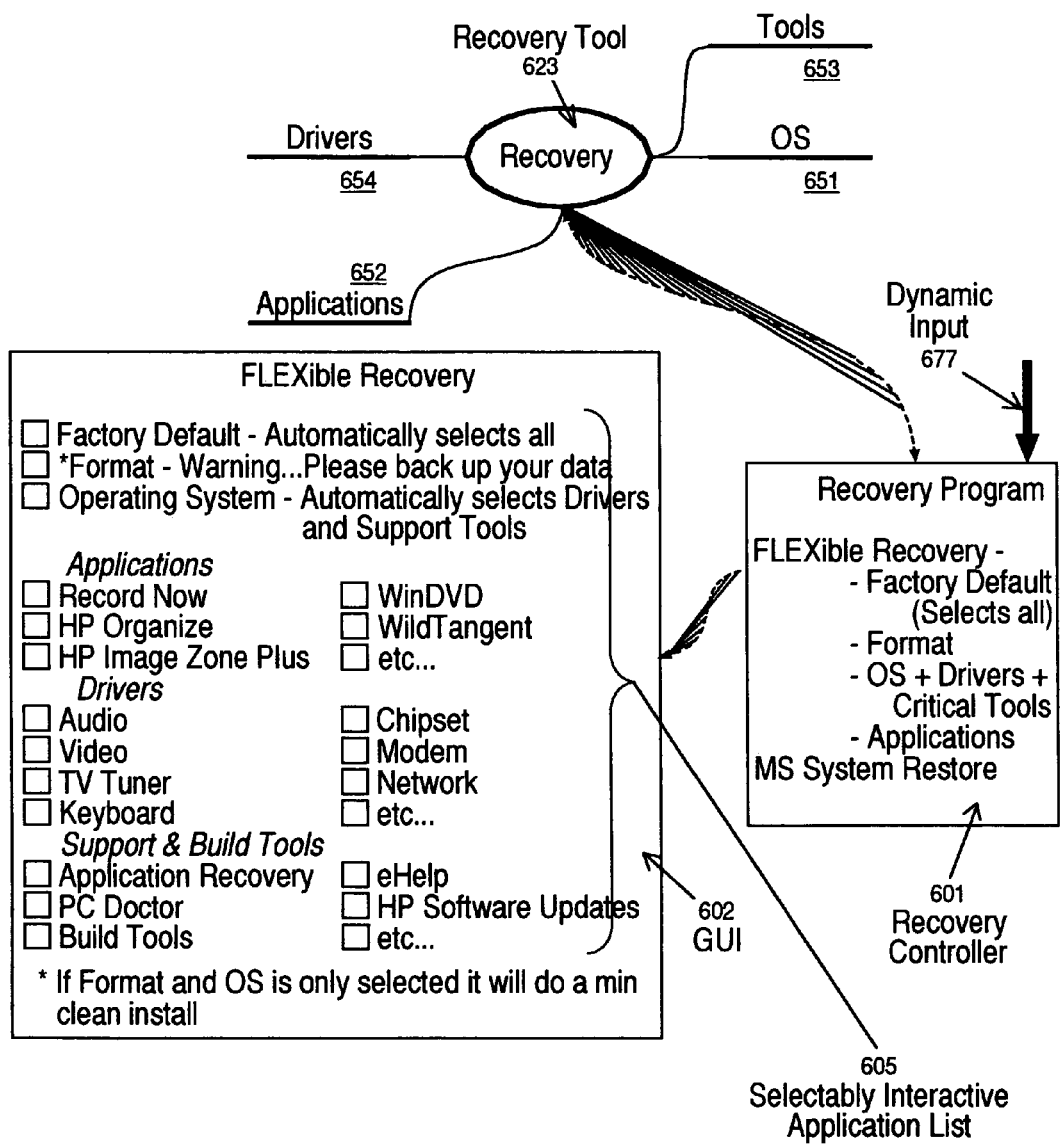
FIG. 6 depicts an exemplary recovery suite, according to an embodiment.

FIG. 6 depicts a recovery application (e.g., suite 600), according to an embodiment. A recovery controller 601 provides a recovery program, which enables recovery operations to proceed by either a flexible (e.g., user selectable, configurable, etc.) recovery pathway or by a conventional pre-programmed OS based system restoration pathway. The flexible pathway established by the recovery controller enables user inputs that pre-set a recovery operation according to a default, such as where all installed applications are selected for installation, a format based (e.g., full system) recovery, restoration of the OS, drivers and critical tools and/or restoration of applications and other tools.

The recovery controller functions with a GUI 602 or another user interface, which displays (e.g., on a monitor, etc.) a selectable user interactive list of applications and settings. A user makes selections from among the listed application entries and settings. The user selections comprise inputs to the recovery controller 601, with which recovery tool 623 is operated. The user inputs correspond to selections of which applications from list 605 are selected for restoration upon running a recovery program (and/or which applications are de-selected for restoration).

Based on the user inputs with GUI 605, recovery controller 601 operates recovery tool 623 to access stored code for copying to the user image upon running a recovery operation. In one embodiment, recovery controller 601 also operates recovery tool 623 to access stored code for copying to the user image upon running a recovery operation based on a dynamic input 677, based for instance on flagging applications that are un-installed by the user from the user partition. In some embodiments, dynamic input 677 comprises an output, signal, flag, etc. from a dynamic recovery information updater. Thus, recovery suite 600 enables a user to configure a recovery operation for a drive in such a way as to restore the user partition of the drive, upon executing a recovery operation, close to the user's own usage model.

Figure 7:
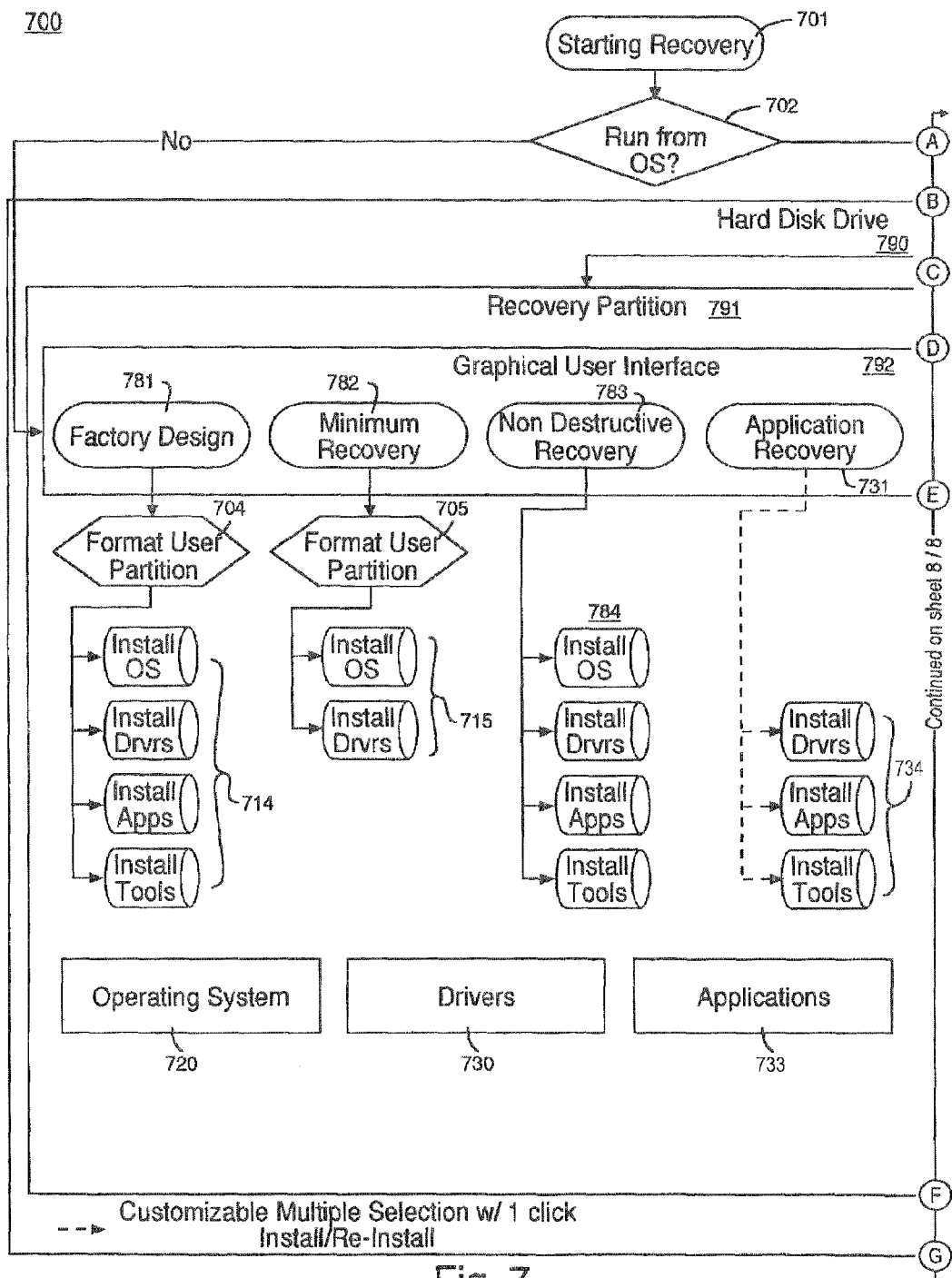
FIG. 7 depicts exemplary recovery data flow, according to an embodiment.
Figure 7:
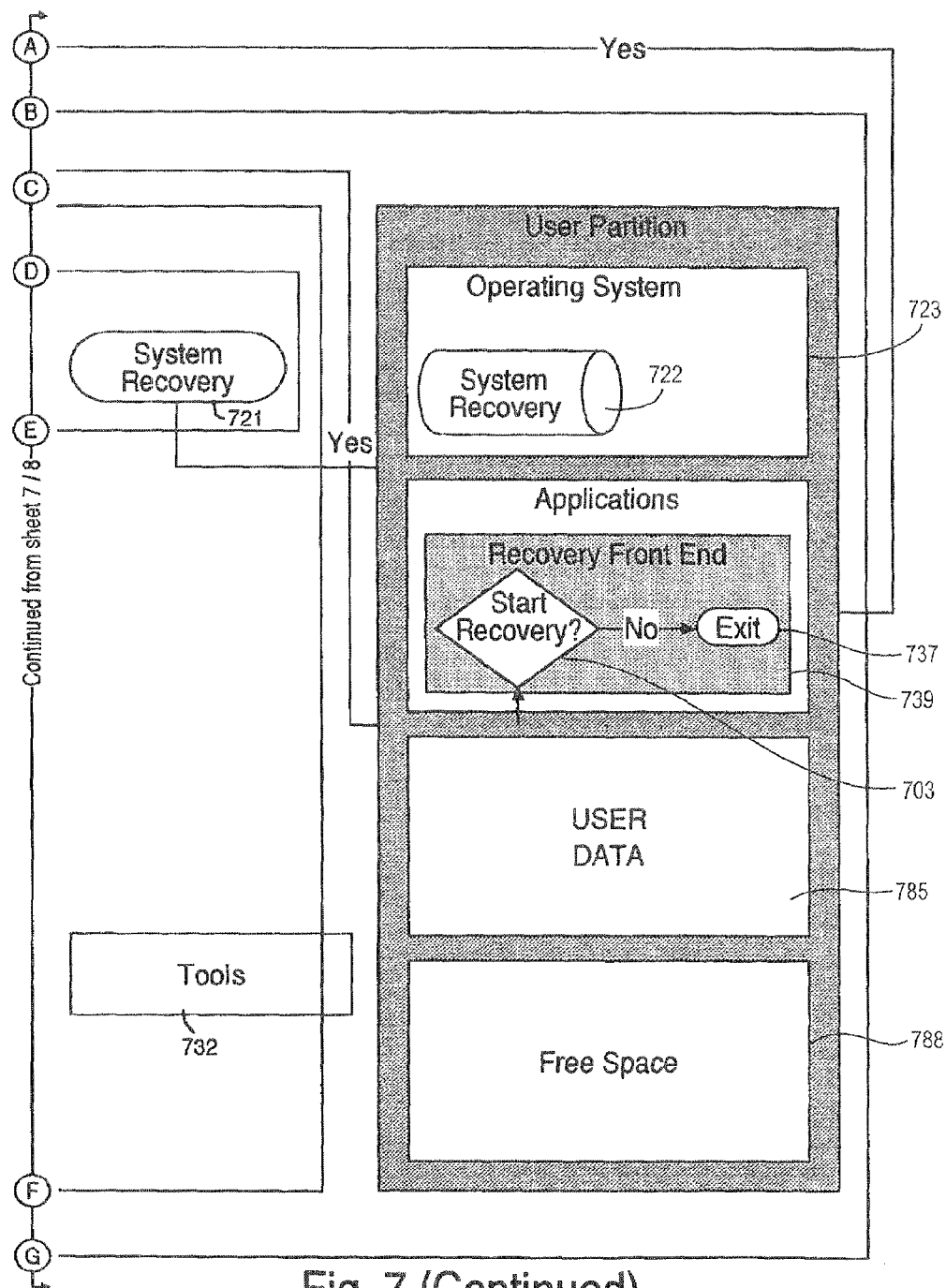

FIG. 7 depicts a recovery data flow 700, according to an embodiment. Upon starting a recovery-related operation at 701, it is determined at 702 whether to run the recovery-related operation from an operating system based recovery platform. If so, the recovery-related operation is handled from a recovery front end 739, among the applications 733 stored on the user partition 792 of computer drive 790. Within the recovery front end 739, it is determined whether to start recovery at 703. If not, the recovery operation is exited at 737. Where recovery is started at 703, or if it is determined in 702 not to run the recovery operation as OS based, then recovery-related user inputs to GUI 792 direct (e.g., control, guide, influence etc.) the recovery operation from the hidden recovery partition 791. Recovery partition 791 has recovery-related information, including code 720 relating to the OS, code 730 relating to drivers, code 731 relating to applications and code 732 relating to tools.

Where the factory default recovery image is selected at GUI input 781, a formatting operation is selected at 704 wherein stored installation codes 714 relating to the OS, drivers, applications and tools are marked for restorative installation upon the user partition 792 upon running recovery. Where the minimum recovery image is selected at GUI input 782, a formatting operation is selected at 705 wherein stored installation codes 715, relating to the OS and drivers, are marked for restorative installation upon the user partition 792 upon running recovery. A non-destructive recovery that does not over-write or otherwise format user data 785, selectable at 783, marks for restorative installation upon the user partition 792, upon running recovery, codes 784 relating to the OS and drivers, and selectably, certain of the applications and tools. Where application recovery is selected at 731, codes 734 selectably relating to certain drivers, applications and tools, are marked for restorative installation upon the user partition 792 upon recovery, upon running recovery. Where OS recovery is selected at 721, codes 720 relating to the OS are marked for restorative installation to the OS system recovery 722 in the OS files 723 of the user partition 792 upon recovery.

Selection of applications for restoration to the user partition 792 upon recovery with application recovery selector 731 enables the user to select (e.g., and/or de-select) certain applications, drivers and tools for restoration upon recovery. In some embodiments, dynamic inputs relating to applications un-installed by the user from user partition 792, such as to free up storage space 788 thereon, are flagged for non-restoration upon recovery. Thus, recovery data flow 700 enables a user to configure a recovery operation for drive 790 in such a way as to restore the user partition 792 of the drive 790, upon executing a recovery operation 703, close to the user's own usage model associated with that drive.

Instructions that when executed cause the performance of operations that are a part of the herein described invention can be contained on at least some form of computer readable media. Computer readable media can be any available media that can be accessed by a processing device. By way of example, and not limitation, computer readable media can comprise computer storage media and communication media. Computer storage media includes volatile and non-volatile, removable and non-removable media implemented in any method or technology for storage of information such as computer readable instructions, data structures, program modules or other data. Moreover, computer storage media can include but is not limited to, RAM, ROM, EEPROM, flash memory or other memory types, CD-ROM, DVD or other optical storage, magnetic cassettes, magnetic tape, magnetic disk storage or other magnetic storage devices, or any other medium which can be used to store the desired information and which can be accessed by a processing device.

What is claimed is:

1. A computer-implemented method for efficiently storing recovery related information on a memory of said computer, comprising:

uninstalling an application from a user image;

accessing a user input relating to a user selection of applications to be restored upon executing a recovery of said computer memory; and storing on a recovery partition of said computer memory a recovery image corresponding to the user image on a user partition of said computer memory, wherein said user image comprises said user selection of applications and wherein, upon said executing said recovery, said user image is configured to correspond to said recovery image, wherein said recovery image is derived from a set of applications that includes the un-installed application.

2. The method as recited in claim 1 wherein said recovery of said computer memory involves computer memory that comprises a drive associated with said computer.

3. The method as recited in claim 1 wherein said information relating to said recovery comprises code relating to at least one of: an operating system, drivers, tools and said user selection of applications.

4. The method as recited in claim 1 wherein said executing said recovery comprises at least one of:

executing a normal recovery, wherein said normal recovery comprises restoring said operating system, drivers, tools and user selection of applications and wherein said restoring is performed with user data stored upon said user partition effectively left intact by said restoring; and executing a full recovery, wherein said full recovery comprises formatting said user partition.

5. The method as recited in claim 1 wherein said accessing said user input is accommodated with a user interface.

6. The method as recited in claim 1 wherein said accessing a user input is accommodated by a user interface that lists applications initially loaded upon said computer memory in an interactive user selectable list.

7. The method as recited in claim 1 wherein said accessing a user input involves a user input that comprises an interactive selection of one or more applications from among said initially loaded applications.

8. The method as recited in claim 5 wherein said accessing a user input is accommodated by said user interface that comprises a graphical user interface.

9. The method as recited in claim 1, further comprising:
monitoring said computer for any applications that are un-installed by said user;
flagging said un-installed applications in said user image; and
dynamically updating said recovery image on the basis of said flagging wherein code relating to said un-installed applications is selectively removed from said recovery image.

10. A computer-implemented method for dynamically updating recovery related information stored on a drive of said computer, comprising:
automatically monitoring a user partition of said computer drive for an un-install wherein said un-install corresponds to a user action taken to un-install an application from a user partition of said computer drive;
flagging a record of said application relating to said un-install thereof; and
based on said flagging, dynamically storing on a recovery partition of said computer drive an updated recovery image corresponding to a user image of said user partition, wherein said user image comprises code relating to applications remaining on said user partition after said un-install, wherein said recovery is executed based upon said recovery image; and configuring upon said recovery, said user image to correspond to said updated recovery image.

11. The method as recited in claim 10, further comprising: accessing a user input relating to a user selection of applications to be restored upon executing a recovery of said computer drive; and updating said recovery partition on the basis of at least one of said flagging and said user input.

12. The method as recited in claim 10 wherein said information relating to said recovery further comprises code relating to at least one of: an operating system, drivers, user selection of applications and tools.

13. The method as recited in claim 10 wherein executing said recovery comprises executing a normal recovery, wherein said normal recovery comprises restoring said operating system, drivers, tools and said selection of applications and wherein said restoring is performed with user data stored upon said user partition effectively left intact by said restoring.

14. The method as recited in claim 10 wherein executing said recovery comprises executing a full recovery, wherein said full recovery comprises formatting said user partition.

15. The method as recited in claim 11, wherein said accessing said user input is accommodated with a user interface.

16. The method as recited in claim 11, wherein said accessing a user input is accommodated by a user interface that lists applications initially loaded upon said computer memory in an interactive user selectable list.

17. The method as recited in claim 11, wherein said accessing a user input involves a user input that comprises an interactive selection of one or more applications from among said initially loaded applications.

18. The method as recited in claim 11, wherein said accessing said user input is accommodated by a user interface that comprises a graphical user interface.

19. A computer-based system for efficiently storing recovery related information on a computer drive, comprising:
one or more memories storing one or more computer readable programs comprising:
a user interface for enabling a user input relating to a user selection of applications to be restored upon executing a recovery of said computer drive; and
a recovery mechanism accessing said user input from said user interface, said recovery mechanism for storing on a recovery partition of said computer drive a recovery image corresponding to a user image on a user partition of said computer drive, wherein said user image comprises said user selection of applications and wherein, upon said executing said recovery, said user image is configured to correspond to said recovery image;
a monitor of said user partition that provides an input to said recovery mechanism, for monitoring said user partition for an application that is un-installed by said user;
a flagging mechanism functional with said monitor, for flagging said un-installed applications in said user image; and
a recovery image dynamic updating mechanism, for dynamically updating said recovery image on the basis of said flagging wherein code relating to said un-installed applications is selectively removed from said recovery image.

20. The system as recited in claim 19 wherein said user interface comprises a graphical user interface.

21. The system as recited in claim 19 wherein said user input relating to a user selection of applications is made with said user interface.

22. The system of claim 19 wherein said user interface lists all applications initially loaded upon said computer drive in an interactive user selectable list.

23. The system of claim 19 wherein said user input comprises an interactive selection of one or more applications from among said initially loaded applications.

24. The system as recited in claim 19 wherein said information relating to said recovery comprises code relating to at least one of: an operating system, drivers, tools and said user selection of applications.

25. A computer-based system for dynamically updating recovery related information stored on a drive of said computer, comprising:
one or more memories storing one or more computer readable programs comprising:
a monitor for automatically monitoring a user partition of said computer drive for an un-install wherein said un-install corresponds to a user action taken to un-install an application from a user partition of said computer drive;
a flagger coupled to said monitor, for flagging a record of said application relating to said un-install thereof;
a recovery image dynamic updater coupled to said flagger, for dynamically updating said recovery image on the basis of said flagging wherein code relating to said un-installed applications is selectively removed from said recovery image; and
a user interface coupled to said recovery image dynamic updater for allowing a user input relating to a user selection of applications to be restored upon executing a recovery of said computer drive, wherein said recovery image is further updated on the basis of said user input and wherein, upon executing a recovery, said user image is configured to correspond to said recovery image.

26. A computer useable medium comprising one or more memories storing computer-executable instructions for performing steps, comprising:
accessing a user input relating to a user selection of applications to be restored upon executing a recovery of said computer memory; and
storing on a recovery partition of said computer memory a recovery image corresponding to a user image on a user partition of said computer memory, wherein said user image comprises said user selection of applications and wherein, upon said executing said recovery, said user image is configured to correspond to said recovery image;
monitoring said computer for any applications that are un-installed by said user;
flagging said un-installed applications in said user image; and
dynamically updating said recovery image on the basis of said flagging wherein code relating to said un-installed applications is selectively removed from said recovery image.

27. The medium as recited in claim 26 wherein said recovery of said computer memory involves computer memory that comprises a drive associated with said computer.

28. The medium as recited in claim 26 wherein said information relating to said recovery comprises code relating to at least one of: an operating system, drivers, tools and said user selection of applications.

29. The medium as recited in claim 26 wherein said executing said recovery comprises at least one of:
executing a normal recovery, wherein said normal recovery comprises restoring said operating system, drivers, tools and user selection of applications and wherein said restoring is performed with user data stored upon said user partition effectively left intact by said restoring; and
executing a full recovery, wherein said full recovery comprises formatting said user partition.

30. The medium as recited in claim 26 wherein said accessing said user input is accommodated with a user interface.

31. The medium as recited in claim 26 wherein said accessing a user input is accommodated by a user interface that lists applications initially loaded upon said computer memory in an interactive user selectable list.

32. The medium as recited in claim 26 wherein said accessing a user input involves a user input that comprises an interactive selection of one or more applications from among said initially loaded applications.

33. The medium as recited in claim 26 wherein said accessing a user input is accommodated by said user interface that comprises a graphical user interface.

34. A computer-implemented method for efficiently storing recovery related information on a memory of said computer, comprising:
accessing a user input relating to a user selection of applications to be restored upon executing a recovery of said computer memory;
storing on a recovery partition of said computer memory a recovery image corresponding to a user image on a user partition of said computer memory, wherein said user image comprises said user selection of applications and wherein, upon said executing said recovery, said user image is configured to correspond to said recovery image, wherein said recovery image is derived from a set of applications that includes at least one un-installed application;
monitoring said computer for any applications that are un-installed by said user;
flagging said un-installed applications in said user image; and
dynamically updating said recovery image on the basis of said flagging wherein code relating to said un-installed applications is selectively removed from said recovery image.

* * * * *